(12) United States Patent
Ozawa et al.

(10) Patent No.: US 9,023,519 B2
(45) Date of Patent: May 5, 2015

(54) CATHODE AND A CATHODE ACTIVE MATERIAL PLATE FOR A LITHIUM SECONDARY BATTERY AND METHOD FOR MANUFACTURING THESE

(71) Applicant: NGK Insulators, Ltd., Nagoya (JP)

(72) Inventors: Shuichi Ozawa, Nagoya (JP); Akira Urakawa, Nagoya (JP); Shigeki Okada, Nishio (JP); Ryuta Sugiura, Toyohashi (JP); Tsutomu Nanataki, Toyoake (JP)

(73) Assignee: NGK Insulators, Ltd., Nagoya (JP)

( * ) Notice: Subject to any disclaimer, the term of this patent is extended or adjusted under 35 U.S.C. 154(b) by 113 days.

(21) Appl. No.: 13/772,500

(22) Filed: Feb. 21, 2013

(65) Prior Publication Data

US 2013/0252087 A1 Sep. 26, 2013

Related U.S. Application Data

(60) Provisional application No. 61/614,611, filed on Mar. 23, 2012.

(51) Int. Cl.
| | |
|---|---|
| *H01M 4/13* | (2010.01) |
| *H01M 4/04* | (2006.01) |
| *H01M 4/139* | (2010.01) |
| *H01M 4/70* | (2006.01) |
| *H01M 4/1391* | (2010.01) |

(52) U.S. Cl.
CPC ............. *H01M 4/13* (2013.01); *H01M 4/0404* (2013.01); *Y02E 60/122* (2013.01); *H01M 4/0471* (2013.01); *H01M 4/139* (2013.01); *H01M 4/1391* (2013.01); *H01M 4/70* (2013.01)

(58) Field of Classification Search
USPC ................. 429/209, 218.1, 231.95; 29/623.1, 29/623.5; 252/182.1
See application file for complete search history.

(56) References Cited

U.S. PATENT DOCUMENTS

| | | | | |
|---|---|---|---|---|
| 7,700,235 | B2 * | 4/2010 | Konishiike et al. | 429/218.1 |
| 8,337,727 | B2 * | 12/2012 | Chen et al. | 252/518.1 |
| 2007/0207386 | A1 * | 9/2007 | Konishiike et al. | 429/232 |
| 2010/0176352 | A1 * | 7/2010 | Chen et al. | 252/521.2 |
| 2011/0278170 | A1 * | 11/2011 | Chiang et al. | 204/483 |

FOREIGN PATENT DOCUMENTS

| | | |
|---|---|---|
| JP | 2001-143687 | 5/2001 |
| JP | 2004-179091 | 6/2004 |
| JP | 2012-003879 | 1/2012 |
| JP | 2012-009193 | 1/2012 |

OTHER PUBLICATIONS

International Search Report and Written Opinion mailed Apr. 2, 2013.

* cited by examiner

*Primary Examiner* — Stewart Fraser
(74) *Attorney, Agent, or Firm* — Burr & Brown, LLC

(57) ABSTRACT

The present invention relates to a cathode and a cathode active material plate for a lithium secondary battery, and the production method thereof. There is a feature of the present invention in that grooves consisting of a concave portion and having an infinite form (for example, an infinite cell-like shape) in a planar view are formed in a principal surface of the cathode active material plate.

20 Claims, 3 Drawing Sheets

CATHODE AND A CATHODE ACTIVE MATERIAL PLATE FOR A LITHIUM SECONDARY BATTERY AND METHOD FOR MANUFACTURING THESE

BACKGROUND OF THE INVENTION

1. Technical Field

The present invention relates to a cathode and a cathode active material plate for a lithium secondary battery, and a method for manufacturing these.

2. Description of Related Art

For example, as a cathode of a lithium secondary battery, those comprising a cathode collector, a plurality of cathode active material particles aligned in two dimensions along the surface of the cathode collector, and a conductive junction layer prepared so that it might intervene between aid cathode collector and said cathode active material particles are known (for example, refer to the patent literature PTL 1 etc.).

CITATION LIST

Patent Literature

[PTL 1] Japanese Patent Application Laid-Open (kokai) No. 2012-009193

SUMMARY OF INVENTION

In a lithium secondary battery, it is demanded to improve its characteristic regarding the decrease in its capacity charge and discharge are repeated (cycle characteristic). The present invention has been made in order to cope with such a subject.

The cathode of the lithium secondary battery which is the target of the present invention comprises a cathode collector and a cathode active material plate joined to the cathode collector through a conductive junction layer. Said cathode active material plate which is the target of the present invention is a plate-like member containing the cathode active material of said lithium secondary battery, and is typically formed in the shape of an approximately plate.

There is a feature of the present invention in that grooves consisting of a concave portion and having an infinite form (for example, an infinite cell-like shape; specifically cellular shape) in a planar view are formed in a principal surface of said cathode active material plate. Typically, the grooves are formed not by machining after sintering, but "As-Fired" (in a state as it is without grinding processing of the surface of a sintered object). That is, specifically, the grooves are naturally generated, for example, during the drying process of a formed object of a slurry which contains a transition metal compound which is material of said cathode active material without passing through machining.

Concavity and convexity (unevenness) resulting from the particle form of said cathode active material (specifically, agglomerated object, which will be mentioned later) may be formed in the inside of said grooves. Typically, the concavity and convexity are formed not by machining after sintering, but "As-Fired" (in a state as it is without grinding processing of the surface of a sintered object). That is, the concavity and convexity are naturally generated, for example, during the drying process of said formed object without passing through machining.

In addition, said cathode collector and said cathode active material plate may be joined through said conductive junction layer in a state where said principal surface of said cathode active material plate with said grooves formed therein is opposed to said conductive junction layer. Alternatively, said cathode collector and said cathode active material plate may be joined through said conductive junction layer in a state where said principal surface of said cathode active material plate with said grooves formed therein is opposed to the side opposite to said conductive junction layer.

Herein, a "principal surface" is the surface which is approximately perpendicular to the "thickness direction" which is a direction to specify "thickness" of said cathode active material plate. Namely, in a state where the cathode active material plate is stably laid on a horizontal plane (plane intersecting perpendicularly with a perpendicular direction in which gravity aims to act), the "principal surface" of said cathode active material plate is the surface which is opposed to said horizontal plane, or the surface which is opposed to a virtual plane which is a plane located on the side opposite to said horizontal plane behind the cathode active material plate (namely, located above the cathode active material plate) and parallel to said horizontal plane. In addition, the above-mentioned "thickness direction" is a normal direction of said horizontal plane. Such a "principal surface" may also be referred to as a "plate surface".

Said cathode active material plate which has said grooves in said principal surface may be manufactured by a production method which has the following steps.

An agglomeration step wherein a granular agglomerated object is formed by using first slurry containing a transition metal compound which is raw material of said cathode active material.

A forming step wherein a formed object in a shape of a thin plate is formed by using second slurry containing said agglomerated object, and grooves consisting of a concave portion and having an infinite form in a planar view are formed in a principal surface of the formed object by drying the formed object.

A firing step wherein said cathode active material plate is obtained by firing said formed object.

Moreover, said cathode of said lithium secondary battery may be manufactured by a production method which has the following steps.

An agglomeration step wherein a granular agglomerated object is formed by using first slurry containing a transition metal compound which is raw material of said cathode active material.

A forming step wherein a formed object in a shape of a thin plate is formed by using second slurry containing said agglomerated object, and grooves consisting of a concave portion and having an infinite form in a planar view are formed in a principal surface of the formed object by drying the formed object.

A firing step wherein said cathode active material plate is obtained by firing said formed object.

A junction step wherein said cathode collector and said cathode active material plate are joined through said conductive junction layer.

In addition, said first slurry and said agglomerated object may contain a transition metal compound other than lithium. In this case, the second slurry contains said agglomerated object and said lithium compound. Moreover, it is suitable for the viscosity of said second slurry to be adjusted to 100-1500 mPa·s.

Moreover, said junction step may be a step wherein said cathode collector and said cathode active material plate are joined through said conductive junction layer, in a state wherein said principal surface of said cathode active material plate in which said grooves are formed is opposed to said conductive junction layer side. Alternatively, said junction step may be a step wherein said cathode collector and said cathode active material plate are joined through said conductive junction layer, in a state wherein said principal surface of said cathode active material plate in which said grooves are formed is opposed to the side opposite to said conductive junction layer said conductive junction layer side.

In said cathode active material plate and said cathode of the present invention which have such configuration, even if the charge and discharge of said lithium secondary battery are repeated, decrease in its capacity is suppressed as much as possible. That is, in accordance with the present invention, superior cycling characteristics in said lithium secondary battery can be realized. The reason for this can be considered as follows.

By coming and going of lithium ions associated with charge and discharge, a dimensional change arises in said cathode active material particles. For this reason, if the charge and discharge of said lithium secondary battery are repeated, in each of the above-mentioned interfaces, usually, delamination will occur gradually, and decrease in capacity will arise (these will be referred to as "interfacial delamination" hereafter).

In this regard, in said cathode active material plate and said cathode of the present invention, said grooves are formed in said principal surface and thereby stress associated with the dimensional change is successfully relieved. Moreover, when said principal surface with said grooves formed therein and said conductive junction layer are joined, said conductive junction layer permeates the grooves and thereby adhesion between said principal surface and said conductive junction layer is improved. Therefore, in accordance with the present invention, occurrence of interface delamination as mentioned above can be suppressed and thereby good cycling characteristics are can be realized.

DETAILED DESCRIPTION OF THE INVENTION

Hereafter, using working examples and comparative examples, suitable embodiments of the present invention will be explained. In addition, the following description about the embodiments merely describes just an example of concretion of the present invention considered to be best at least at the time of application as specifically as possible, in order to satisfy the written requirements for the specification demanded by law (the requirements for description, an enabling requirement, etc.).

Therefore, as will be described later, it is quite a matter of course that the present invention is not limited to the specific configuration of the embodiments and working examples described below in any way. Since a consistent understanding of explanation of the embodiments will be barred if exemplifications of various kinds of change (modified example: modification) which may be given to the embodiments and working examples is inserted during explanation of the embodiments, they will be collected into an end as much as possible.

1. Schematic Configuration of Lithium Secondary Battery

Figure 1:
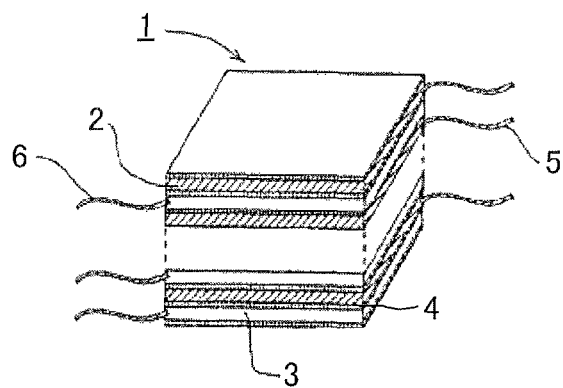
FIG. 1 is a sectional view showing an example of the schematic configuration of a lithium secondary battery.

FIG. 1 is a sectional view showing an example of the schematic structure of a lithium secondary battery 1. Referring to FIG. 1, the lithium secondary battery 1 is what is called a liquid type, and is equipped with a cathode plate 2, an anode plate 3, a separator 4, a tab 5 for cathode, and a tab 6 for anode.

The separator 4 is disposed between the cathode plate 2 and the anode plate 3. That is, the cathode plate 2, the separator 4, and the anode plate 3 are laminated in this order. The tab 5 for cathode is electrically connected to the cathode plate 2. Similarly, the tab 6 for anode is electrically connected to the anode plate 3.

The lithium secondary battery 1 shown in FIG. 1 is constituted by liquid-tightly enclosing the laminated object of the cathode plate 2, the separator 4, and the anode plate 3, as well as electrolytic solution containing a lithium compound as electrolytes in a predetermined battery case (not shown).

2. Configuration of Cathode

Figure 2:
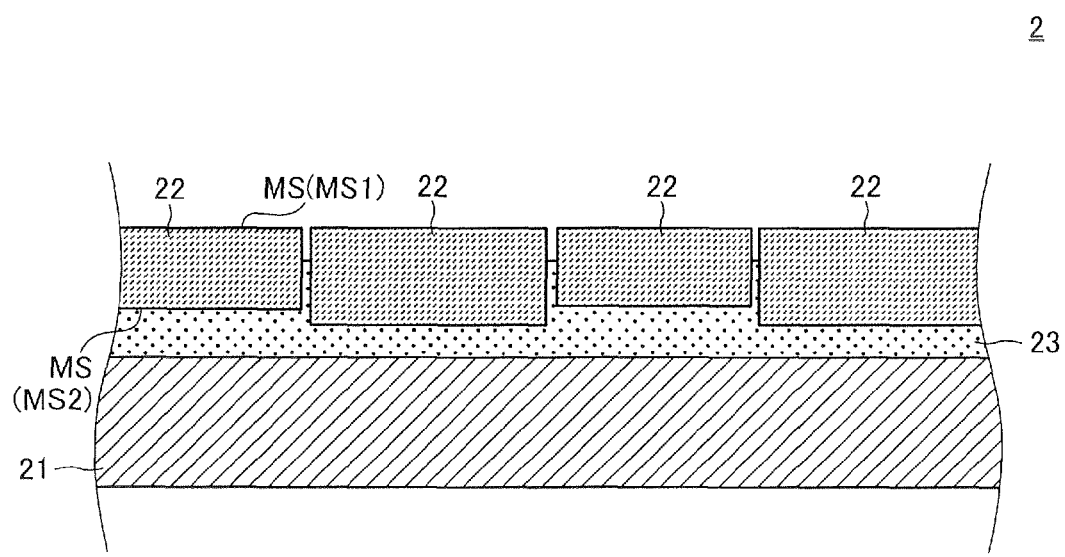
FIG. 2 is an expanded sectional view of an example of the cathode plate shown in FIG. 1.

FIG. 2 is an expanded sectional view of an example of the cathode plate 2 shown in FIG. 1. Referring to FIG. 2, the cathode plate 2 is equipped with a cathode collector 21, a number of cathode active material particles 22, and a conductive junction layer 23.

The cathode collector 21 is a member in the shape of a plate or a film, which has good conductivity and is formed by, for example, aluminum foil etc.

The cathode active material particles 22 are particles which consist of a lithium composite oxide (lithium transition metal oxide), and are formed in the shape of plate. Namely, a pair of principal surfaces MS of the cathode active material particles 22 are formed approximately planate and approximately parallel to each other. In addition, among the pair of principal surfaces MS, one on the electrolytic solution side is referred to as a first principal surface MS1 and the other on the conductive junction layer 23 side is referred to as a second principal surface MS2. Moreover, a "lithium composite oxide" is an oxide represented by $Li_xMO_2$ ($0.05<x<1.10$, M is at least one kind of transition metal: typically M contains one or more from Co, Ni, and Mn).

By the way, among various lithium composite oxides, lithium cobaltate (lithium salt of cobaltic acid) cubically expands at the time of charge (when a lithium ion goes out), while lithium nickelate (lithium salt of nickelic acid) cubically expands at the time of discharge (when a lithium ion comes into). For this reason, it is possible by properly adjusting a composition ratio to apparently make cubical expansion and contraction at the time of charge and discharge into zero. However, even in this case, the length of a lattice changes. Specifically, $Li(Co_{0.5}Ni_{0.5})O_2$ expands in the direction of c axis, while it shrinks in the direction of a axis.

Therefore, the present invention is quite effective for said plate-like particles having composition of a lithium composite oxide with layered rock-salt structure (for example, lithium cobaltate $Li_pCoO_2$ [in the general formula $1 \le p \le 1.1$], lithium nickelate $LiNiO_2$, lithium manganate $Li_2MnO_3$, lithium nickelate manganate $Li_p(Ni_{0.5}, Mn_{0.5})O_2$, these solid solutions represented by a general formula $Li_p(Co_x, Ni_y, Mn_z)O_2$ [in the general formula $0.97 \le p \le 1.07$, $x+y+z=1$], $Li_p(Co_x, Ni_y, Al_z)O_2$ [in the general formula $0.97 \le p \le 1.07$, $x+y+z=1$, $0<x \le 0.25$, $0.6 \le y \le 0.9$, $0<z \le 0.1$], the solid solution of $Li_2MnO_3$ and $LiMO_2$ (M is transition metals, such as Co and Ni), etc). In addition, one or more kinds of elements, such as Mg, Al, Si, Ca, Ti, V, Cr, Fe, Cu, Zn, Ga, Ge, Sr, Y, Zr, Nb, Mo, Ag, Sn, Sb, Te, Ba, and Bi, may be contained in the range which fills the above-mentioned general formulae.

Moreover, it is especially effective to apply the present invention to composition which reveals large cubical expansion and contraction (for example, when the mole fraction of nickel is 0.75 or more or the mole fraction of cobalt is 0.9 or more in $Li_p(Co_x, Ni_y, Mn_z)O_2$ and when mole fraction of nickel is 0.7 or more in $Li_p(Co_x, Ni_y, Al_z)O_2$).

A number of cathode active material particles 22 are aligned in two dimensions along the surface (upper surface in the figure) of the cathode collector 21. Specifically, a number of cathode active material particles 22 are arranged so that 85 to 98% of the above-mentioned surfaces of the cathode collector 21 may be covered with the cathode active material particles 22.

The conductive junction layer 23 is disposed so that it may intervene between the cathode collector 21 and the cathode active material particles 22. That is, the cathode plate 2 is formed in the state where the cathode collector 21 and a number of cathode active material layers 22 are mutually joined (laminated) through the conductive junction layer 23.

The conductive junction layer 23 is formed by applying conductive paste on the above-mentioned surface (upper surface in the figure) of the cathode collector 21. This conductive paste is obtained by mixing and pasting conductive particles, binder resin, and a solvent. As conductive particles, it is possible to use carbon, gold, platinum, nickel, aluminum, etc., and carbon is suitable. As binder resin, it is possible to use an acrylic resin, a fluoro-resin, etc., and a fluoro-resin (especially, polyvinylidene fluoride) is suitable.

Figure 3:
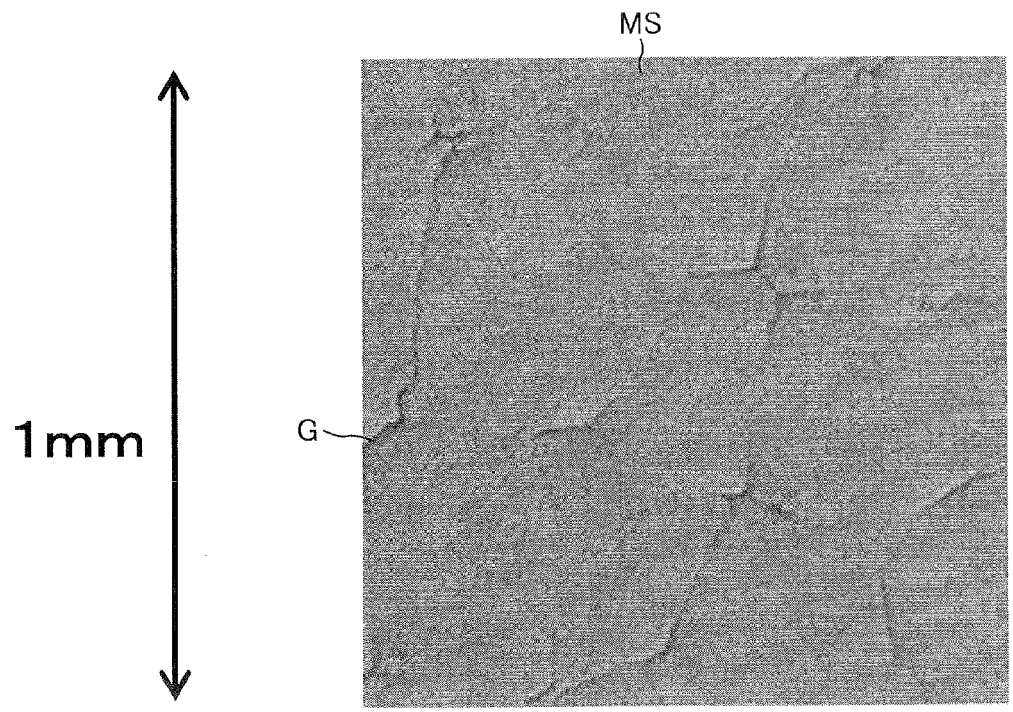
FIG. 3 is an expanded optical microscope photograph of the principal surface of the cathode active material plate shown in FIG. 2.
Figure 4:
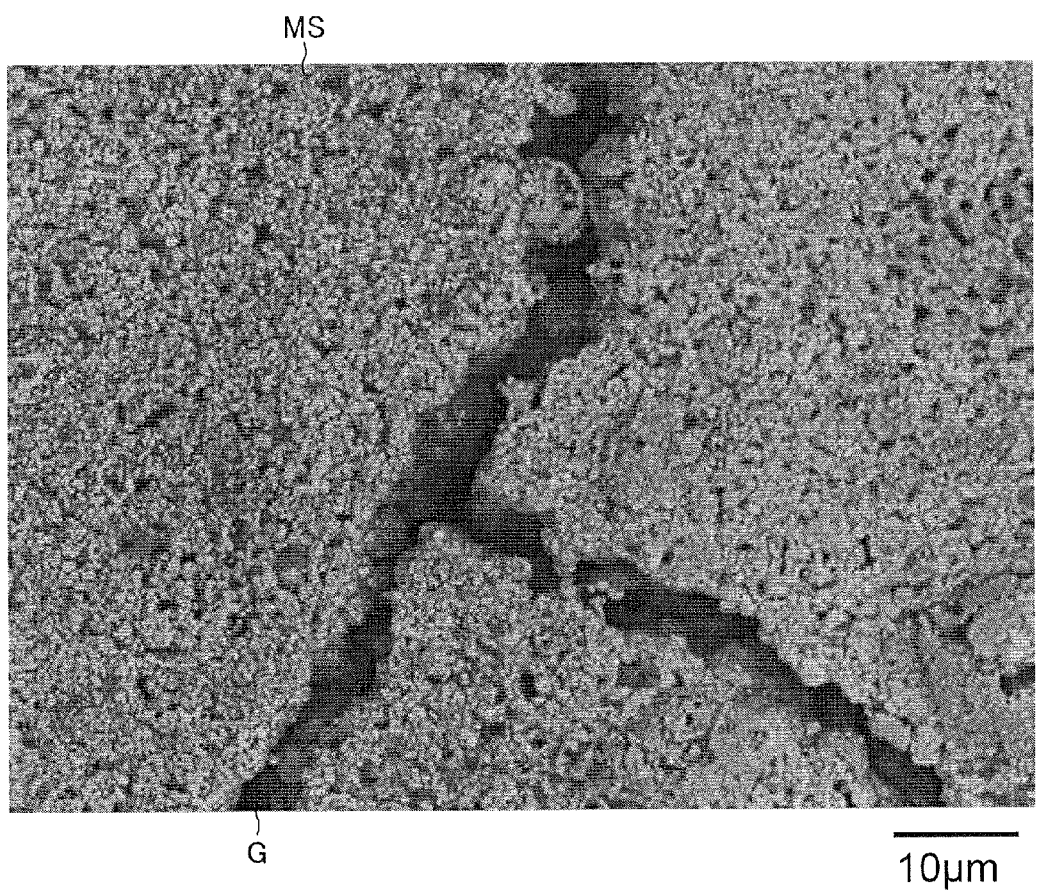
FIG. 4 is an expanded scanning electron micrograph of the circumference of the groove in the principal surface of the cathode active material plate shown in FIG. 3.

FIG. 3 is an expanded optical microscope photograph of the principal surface MS of the cathode active material particle 22 shown in FIG. 2. As shown in FIG. 3, grooves G which consist of concave portions are formed in an infinite form (for example, an infinite cell-like shape; specifically cellular shape) in a planar view in the principal surface MS. FIG. 4 is an expanded scanning electron micrograph of the circumference of the grooves G in the principal surface MS of the cathode active material particle 22 shown in FIG. 3. As shown in FIG. 4, Irregular concavity and convexity (unevenness) are formed in the inside of the grooves G. The concavity and convexity result from the particle form of the material particles (specifically, agglomerated object which will be mentioned later) which constitute the cathode active material particles 22.

In addition, the grooves G are disposed in at least one of the first principal surface MS1 and second principal surface MS2. Typically, the grooves G are disposed in only one of the pair of principal surfaces MS of the cathode active material particles 22. Therefore, the grooves G may be disposed in only either first principal surface MS1 or second principal surface MS2 by arranging the orientation of the cathode active material particles 22 at the time of joining to the cathode collector 21 through the conductive junction layer 23. Alternatively, the cathode active material particles 22 which have the grooves G in first principal surface MS1 and the cathode active material particles 22 which have the grooves G in second principal surface MS2 may be randomly aligned by arranging randomly the orientation of the cathode active material particles 22 on the above-mentioned junction.

3. Outline of Production Method

Hereafter, the outline of the production method of the cathode plate 2 shown in FIG. 2 will be explained.

(A) Agglomeration Step

A granular agglomerated object is formed by using first slurry containing a transition metal compound which is raw material of the cathode active material. Herein, the first slurry contains a compound of transition metal other than lithium. Specifically, for example, when the composition of a cathode active material is a lithium-nickel-cobalt-aluminum composite oxide, the first slurry can be prepared by mixing a nickel compound (NiO etc.), a cobalt compound ($CoO_3O_4$ etc.), and an aluminum compound ($Al_2O_3$ etc.).

(B) Forming Step

A formed object in a shape of a thin plate is formed by using second slurry containing said agglomerated object, and such a formed object is dried. Thereby, grooves consisting of a concave portion and having an infinite form in a planar view are formed (in the inside of the grooves, concavity and convexity (unevenness) as shown in FIG. 4 are formed). Herein, the second slurry can be prepared by mixing the above-mentioned agglomerated object and lithium compound ($Li_2CO_3$ etc.). Moreover, it is suitable for the viscosity of this second slurry to be adjusted to 100-1500 mPa·s.

(C) Firing Step

The cathode active material particle 22 is obtained by firing the above-mentioned formed object.

(D) Junction Layer Paste Coating Step

The above-mentioned conductive paste which will constitute the conductive junction layer 23 is evenly applied on the surface (upper surface in the figure) of the cathode collector 21. Thereby, a conductive paste coating layer is formed on the surface of the cathode collector 21.

(E) Junction Step

A number of the cathode active material particles 22 aligned in two dimensions and the cathode collector 21 with the conductive paste coating layer formed thereon are joined.

Such a junction step is specifically performed as follows:

First, a number of cathode active material particles 22 are aligned in two dimensions on the surface of a surface plate which has high flatness. Next, the cathode collector 21 with the conductive paste coating layer formed thereon is located and lightly pressed on the cathode active material particles 22 aligned on the surface of the surface plate so that the conductive paste coating layer may be opposed to the cathode active material particle 22 side.

4. Example A

Hereafter, specific examples (working examples) of the production method of the cathode active material particles 22 shown in FIG. 2-FIG. 4, and the evaluation result thereof will be explained.

4-1. Production Method (1) Preparation of Slurry $Ni(OH)_2$ powder (manufactured by Kojundo Chemical Laboratory Co., Ltd.) 81.6 weight part, $Co(OH)_2$ powder (manufactured by Wako Pure Chemical Industries, Ltd.) 15.0 weight part, and $Al_2O_3 \cdot H_2O$ powder (manufactured by SASOL) 3.4 weight part were weighed. Next, a vehicle consisting of pure water 97.3 weight part and a dispersing agent (manufactured by NOF Corporation: product number AKM-0521) 0.4 weight part, 1-octanol (manufactured by Katayama Chemical Industries Co., Ltd.) 0.2 weight part as an antifoaming agent, a binder (manufactured by Japan Vam & Poval Co., Ltd.: product number PV3) 2.0 weight part was prepared.

Then, slurry was prepared by wet mixing and grinding such a vehicle and the raw material powders (above-mentioned weighed matters). The wt mixture and pulverization was performed by processing for 24 hours by a ball mill which used zirconia balls with a diameter of 2 mm and thereafter processing for 40 minutes by a bead mill using zirconia beads with a diameter of 0.1 mm.

(2) Agglomeration

By supplying the above-mentioned slurry to a spray dryer with two fluid nozzle system, an agglomerated object was formed. It is possible to form agglomerated objects with various sizes by suitably adjusting parameters, such as jet pressure of a spray dryer, a diameter of a nozzle, and the amount of circulating winds. This time, the average particle diameter (median size: D50) of the agglomerated object was 2 micrometers.

(3) Heat Treatment (Provisional Firing)

Cathode active material precursor particles which were particles of composite oxide of nickel, cobalt, and aluminum (($Ni_{0.8}$, $Co_{0.15}$, $Al_{0.15}$)O) was obtained by heat-treating the above-mentioned agglomerated object at 1100° C. for 3 hours (air atmosphere).

(4) Forming

The obtained cathode active material precursor particle powder 100 weight part, a dispersion medium (xylene:butanol=1:1) 100 weight part, polyvinyl butyral (manufactured by Sekisui Chemical Co., Ltd.: product number BM-2) 10 weight part as a binder, DOP(dioctyl phthalate: manufactured by Kurogane Kasei Co., Ltd.) 4.5 weight part as a plasticizer, a dispersing agent (manufactured by Kao Corpora, product name "Rheodol SPO-30") 3 weight part were weighed and preliminarily mulled in a mortar, and thereafter mulled using a Tri-Roll (mulling machine) to prepare slurry for forming with a viscosity of 1000 cP (viscosity was measured using a LVT type viscometer manufactured by Brookfield).

Using the obtained slurry for forming, sheet with a thickness of 50 micrometers was formed by a doctor blade method. By die-cutting processing of the sheet after drying, 1 mm-square green sheet formed object of 1 mm around was obtained.

In the surface opposite to the delamination area from PET film among the principal surfaces of such a formed object (namely, surface exposed to the open air at the time of drying), grooves had generated in an infinite cell-like form the planar view, and minute concavity and convexity (unevenness) resulting from the shape of the above-mentioned agglomerated object were formed in the inside of such a groove. On the contrary to this, the delamination surface from PET film among the principal surfaces of such a formed object was a quite smooth surface (plane in a form which followed the surface of smooth PET film) in which grooves as mentioned above had not been produced.

(5) Firing (Lithium Introduction)

By heat-treating the 1 mm-square green sheet formed object obtained as mentioned above at 900° C. in air atmosphere, degreasing and provisional firing of the formed object were performed. The temperature for provisional firing of the formed object is lower than the temperature for the above-mentioned heat treatment (provisional firing of the agglomerated object). This is for suppressing the progress of sintering between internal particles at the time of the provisional firing of the formed object and thereby making lithium spread and react uniformly at the time of the real firing which follows.

By mixing the resultant provisionally-fired object with powdery lithium hydroxide monohydrate ($LiOH.H_2O$) in a mortar and heat-treating the same at 750° C. for 6 hours (oxygen atmosphere), plate-like particles having composition of $Li(Ni_{0.8}, Co_{0.15}, Al_{0.05})O2$ were prepared.

(6) Junction Layer Paste Coating Step

By mixing acetylene black, polyvinylidene fluoride (PVDF), and NMP (N-methylpyrolidone) so as to be 1:1:100 weight parts ratio, conductive paste was prepared. This conductive paste was applied to the surface of aluminum foil with a thickness of 20 micrometers which serves as the cathode collector 21 using a coating machine so that its thickness after application might be set to 80 micrometers. Then, the conductive paste coating layer was dried by heating the same at 80° C. for 13 minutes in air atmosphere. In this case, the volume ratio of the solvent (NMP) in the coating layer was 20%.

(7) Junction Step

Next, the cathode active material particles 22 obtained as mentioned above were aligned on the surface of a surface plate in two dimensions as tightly as possible. Then, as mentioned above, the cathode collector 21 with the dried conductive paste coating layer formed thereon is located on the cathode active material particles 22 aligned on the surface of the surface plate so that the conductive paste coating layer may be opposed to the cathode active material particle 22 side, and lightly pressed with pressure of 100 g/mm$^2$ and thereafter the conductive paste coating layer was sufficiently dried by heating the same at 80° C. for 1 hour.

4-2. Valuation Method

As for the cathode manufactured by the production method in the above-mentioned specific example, cycling characteristics (capacity maintenance rate) was evaluated as follows.

By arranging the obtained cathode, an anode plate consisting of a lithium metal plate, an anode collector made from stainless steel, and a separator in order of cathode-separator-anode-anode collector while the aluminum foil side in the cathode is opposed to the outside (side opposite to the separator) and fulfilling this accumulated object with electrolytic solution, a coin cell was produced. The electrolytic solution was prepared by dissolving $LiPF_6$ in an organic solvent obtained by mixing ethylene carbonate (EC) and diethyl carbonate (DEC) at equal volume ratio so that the concentration of $LiPF_6$ may become 1 mol/L.

As for the produced battery, a charge-and-discharge operation wherein the battery was constant-current charged with a current value of 0.2 C rate until battery voltage became 4.3 V, then constant-voltage charged under current condition in which the battery voltage was maintained at 4.3 V until its current value decreased to 1/20 and thereafter paused for 10 minutes, and subsequently constant-current discharged with a current value of 0.2 C rate until battery voltage became 3.0 V and thereafter paused for 10 minutes was repeated 20 cycles in total under a condition of 25° C. By dividing the measured value of discharge capacity at 20th cycle by that at the first cycle and expressing the same in percentage, "capacity maintenance rate" was obtained.

4-3. Evaluation Result

In the above-mentioned examples, during the junction step, as for Working Example 1, the principal surface MS opposite to the side which had the grooves G in the cathode active material particles 22 was jointed with the conductive paste coating layer and, as for Working Example 2, the principal surface MS on the side which had the grooves G in the cathode active material particles 22 was jointed with the conductive paste coating layer. Moreover, Comparative Example 1 wherein both of a pair of principal surfaces had no grooves was produced.

The evaluation results of Working Example 1, Working Example 2, and Comparative Example 1 are shown in Table 1.

TABLE 1

|  | Capacity Maintenance Rate [%] |
| --- | --- |
| Working Example 1 | 93 |
| Working Example 2 | 97 |
| Comparative Example 1 | 88 |

As is clear from the results in Table 1, in Working Examples 1 and 2 which have the grooves G in one of a pair of principal surfaces MS in the cathode active material particles 22, better cycling characteristics were obtained than that of Comparative Example 1.

In addition, Comparative Example 1 was obtained by making the compounding ratio of the dispersion medium at the time of preparing the slurry for forming in the forming step into 40 weight parts. The viscosity of the slurry for forming in this Comparative Example 1 was 5000 mPa·s. On the contrary to this, the viscosity of the slurry for forming in Working Examples (dispersion medium: 100 weight part) was 1000 mPa·s. And the amount of dispersion medium corresponding to the viscosity of 100 to 1500 mPa·s is equivalent to 80 to 120 weight part in the above-mentioned example.

That is, the surface area of the above-mentioned agglomerated object is smaller than that of its powder state before agglomeration. For this reason, the quantity of the dispersion medium for adjusting the viscosity of the slurry for forming which is supplied to a forming step to a predetermined viscosity should be comparatively smaller in a case where an agglomerated object is made into slurry than that in a case where raw material in a powder state before agglomeration is made into slurry.

In this regard, in the above-mentioned Working Examples, the quantity of dispersion medium is made more superfluous than the usual quantity (namely, quantity in Comparative Example 1) and thereby the viscosity of the slurry for forming is lowered. Then, it is believed that the convection of slurry occurs during drying process of a formed object and thereby grooves as mentioned above are formed. Thus, the grooves G formed in the cathode active material particles 22 have irregular concavity and convexity (unevenness) inside as shown in FIG. 4. For this reason, the adhesion between the cathode active material particles 22 and the conductive junction layer 23 increases further.

In addition, as for the amount of dispersion medium to be added (which relates to the viscosity of the slurry for forming), if it becomes more than 200 weight parts, the amount of contraction during drying process will become large, and a cleavage (crack) will occur on a sheet. A crack with width of at least 20 micrometers or more induces faults, such as curvature of a sheet.

Thus, in the above-mentioned Working Examples, the grooves G in an infinite form in a planar view are formed in the principal surface MS of the cathode active material particles 22. The grooves G are formed "As-Fired" (in a state as it is without grinding processing of the surface of a sintered object), and specifically naturally generate during the drying process of a formed object of the slurry for forming without passing through machining. For this reason, the grooves G have a shape with complicated concavity and convexity (unevenness) in its inside (inner surface) as shown in FIG. 4. Such concavo-convex shape in the inside of the grooves G is formed due to the form of the agglomerated object.

In accordance with such configuration, conductive paste enters into the above-mentioned grooves or concavity and convexity (unevenness), and thereby the anchor effect becomes large and the adhesion between the cathode active material particles 22 and the conductive junction layer 23 increases further. As a result, interface delamination is suppressed, and thereby cycling characteristics are improved. The grooves G formed during drying process of the formed object have larger concavity and convexity (unevenness) than grooves formed by machining before drying process and, therefore, the anchor effect becomes larger. Especially, it is suitable to use an agglomerated object like the above-mentioned Working Examples, since the projection portion consisting of particles of agglomerated objects is formed inside (inner surface) and concavity and convexity (unevenness) becomes more complicated.

As mentioned above, under the manufacturing conditions (composition of a cathode active material, etc.) in the Working Examples, grooves can be successfully formed under agglomeration conditions of 1 to 10 micrometers (average particle diameter: ditto) and when the amount of dispersion medium to be added is 80 to 120 weight part. However, it is a matter of course that the agglomeration conditions and the amounts of dispersion medium to be added for successfully forming grooves can be changed if composition etc. was changed. But, it is needless to say that suitable agglomeration conditions and amount of dispersion medium can be obtained by a few-restricted-times trial and error (at most 5 to 10 examples) if a well-known optimization technique, such as an experimental design method etc., is used.

5. Example B

The configuration of a lithium secondary battery which is a target for application of the present invention is not limited to a liquid type battery configuration as mentioned above. Then, in this example, a case where the present invention is applied to the battery using gel electrolyte as electrolyte. Specifically in this example, a case where decrease in electric discharge capacity is suppressed by using an electrode having a surface with grooves formed thereon opposed to the side opposite to a junction layer in a battery which uses gel electrolyte as electrolyte will be explained.

5-1. Production Method of Battery Using Gel Electrolyte

Except for using gel electrolyte instead of electrolytic solution, a cathode and a battery were produced similarly to the above-mentioned Example A. The gel electrolyte was prepared in accordance with the following procedures.

Ethylene carbonate (EC) 47 weight part, propylene carbonate (PC) 42 weight part, and lithium hexafluorophosphate (LiPF6) 11 weight parts were mixed.

With the above-mentioned mixed solution 30 weight part, binary copolymer of vinylidene fluoride (VDF) and hexafluoropropylene (HFP) with an average molecular weight of about 400,000 10 weight parts and dimethyl carbonate (DMC) 60 weight part were mixed, and heated the at 60° C. in an airtight container.

On a produced electrode (cathode), the above-mentioned solution was evenly applied, and stood for 12 hours at normal temperature, and thereby DMC was evaporated and removed. In addition, the thickness of the electrolyte on the cathode after allowing it to stand was 20 micrometers.

5-2. Valuation Method

By arranging the obtained cathode (cathode with gel electrolyte applied thereon), an anode plate consisting of a lithium metal plate, and an anode collector made from stainless steel in order of cathode-anode-anode collector while the aluminum foil side in the cathode is opposed to the outside (side opposite to the anode), a coin cell was produced. As for the produced battery, a charge-and-discharge operation was performed under a condition similar to that in Example A, electric discharge capacity at first cycle was measured. Electric discharge capacity was the capacity per unit weight obtained by dividing the capacity of the battery by the total weight of the cathode active material plate which had been preliminarily obtained.

5-3. Evaluation Result

The configurations and evaluation results of Working Example 3, Comparative Example 4 and Comparative Example 5 evaluated in the present example are shown in the following Table 2.

TABLE 2

|  | Configuration of Cathode | Discharge Capacity [mAh/g] |
|---|---|---|
| Working Example 3 | The groove-formed side of the active material plate is opposite to the junction layer. | 185 |
| Comparative example 4 | The groove-formed side of the active material plate is on the junction layer side. | 123 |
| Comparative Example 5 | The active material plate has no grooves formed thereon. | 104 |
| References | Working Example 1 & 2, Comparative Example 1 | 190 |

In Working Example 3 using a cathode wherein the groove-formed side of said cathode active material plate is opposed to the side opposite to the junction layer (that is, the gel electrolyte side), as compared with the electric discharge capacity (190 mAh/g) of the liquid type battery (references: Working Example 1 and 2, and Comparative Example 1) using the above-mentioned electrolytic solution in Example A, decrease in electric discharge capacity was smaller. When the cross-section of the active material plate of Working Example 3 was observed, it was confirmed that the gap which exists in the inside of the active material plate (space which exists between agglomerated powders) was filled up with the gel electrolyte uniformly (extensively). On the contrary to this, in Comparative Examples 4 and 5, as compared with the electric discharge capacity of the references, decrease in electric discharge capacity was larger. As a result of cross-sectional observation of active material plates, although its front side (side opposite to the junction layer) was filled up with the gel electrolyte, its junction layer side was not filled up.

As mentioned above, it is believed that since the grooves were formed in the surface on the side opposite to the junction layer of the active material plate (that is, the gel electrolyte side) in Working Example 3, as compared with Comparative Examples 4 and 5 wherein the grooves were not formed in the surface on the side opposite to the junction layer of the active material plate, gel electrolyte could permeate easily to the inside of the active material plate and is filled up uniformly (extensively) when the solution containing the gel electrolyte was applied to the active material plate and, as a result, the contact area between the gel electrolyte and the active material plate increased, movement of a lithium ion between the gel electrolyte and the active material became easy, and decrease in electric discharge capacity could be suppressed.

The above shows that it is suitable to fill the inside of the active material plate with the gel electrolyte more uniformly (extensively) in order to suppress decrease in electric discharge capacity. As a method for filling the inside of the active material plate with the gel electrolyte more uniformly (extensively), for example, the following methods can be exemplified.

(1) By increasing the quantity of a solvent (DMC etc.) in solution containing gel electrolyte to dilute the same, the viscosity of the solution is made low and an active material plate is filled up with the same. In this case, taking it into account that the filling rate of the gel electrolyte in the gap of the active material plate decreases when removing the solvent after filling, it is preferable that the quantity of the solvent is 90 weight parts or less to 100 weight part of the solution.

(2) By heating solution which contains gel electrolyte (at temperature higher than 60° C., for example 80° C.) at the time of filling to an active material plate, the viscosity of the solution is made low and the active material plate is filled up with the same.

(3) An active material plate is filled up with gel electrolyte under reduced pressure.

(4) The surface of an active material (wall surface in the gap of an active material plate) is preliminarily modified with material having high affinity with gel electrolyte (silane coupling agent etc.).

Moreover when a cathode wherein the groove-formed side of an active material plate is opposed to a junction layer side, or a cathode wherein an active material plate with no groove formed thereon is employed, is used, for example, the following methods enable it to fill up the inside of an active material plate with gel electrolyte.

(5) Before an active material plate is aligned on the surface of a surface plate, the active material plate is filled up with gel electrolyte (an active material plate which has been preliminarily filled up with gel electrolyte is used in the junction step). In this case, it is more suitable to use it in conjunction with a method like the above-mentioned (1) to (3).

(6) Grooves are formed (cracks are created) in an active material plate by bending the whole electrode sheet after joining the active material plate with a junction layer (conductive paste).

(7) After mixing gel electrolyte with the conductive paste and applying it, an active material plate is joined with a junction layer (conductive paste). Since gel electrolyte exudes from a junction layer to fill the gap of the active material plate in accordance with this method, it is especially effective in a cathode wherein the groove-formed side of the active material plate is opposed to a junction layer side.

In addition, although the gel electrolyte using binary copolymer of vinylidene fluoride (VDF) and hexafluoropropylene (HFP) was used in the above-mentioned Example A, the material of gel electrolyte is not limited to such a specific material. As a material of gel electrolyte, for example, polyvinylidene fluoride (PVDF), polytetrafluoroethylene (PTFE), poly hexafluoropropylene (PHFP), binary copolymer of vinylidene fluoride (VDF)-hexafluoropropylene (HFP), binary copolymer of tetrafluoroethylene (TFE)-hexafluoropropylene (HFP), and ternary copolymer of VDF-HFP-TFE, etc. can be used. Especially, fluoride-containing polymer or oligomer which contains a HFP unit is preferable.

By the way, generally, when the HFP ratio in a polymer molecule becomes large, there is a tendency for the retaining amount of electrolytic solution to become large, and for ionic conductivity to become large. On the other hand, as for the mechanical strength as gel polymer, there is a tendency to decrease as the HFP ratio in a polymer molecule becomes large. Therefore, in the use which must achieve a balance between ionic conductivity and mechanical strength, it is necessary to adjust the HFP ratio in a polymer molecule in the suitable range.

However, as for gel electrolyte with which the inside (gap) of an active material plate is filled up, since the active material plate can bear mechanical strength, there is no necessity of taking the mechanical strength of gel polymer into consideration. Therefore, as for such gel electrolyte, it becomes possible to use polymer or oligomer with a high HFP ratio (for example, polymer in which a HFP ratio by weight exceeds 80%). Since polymer with high ionic conductivity can be used as gel polymer thereby, gel electrolyte with high ionic conductivity can be obtained. Moreover, the mechanical strength of polymer or oligomer with a high HFP ratio is low (soft), viscosity when dissolved in a solvent, such as DMC, becomes low, and it becomes easier to fill up the inside of an active material therewith. As a result, the filling rate in the inside of the active material can be raised, the ion conductivity inside of the gap of the active material can be raised. In addition, when the material of the gel electrolyte between a cathode and an anode of a battery is required for mechanical strength, for example, as a material of the gel electrolyte with which the inside of an active material is filled up, polymer or oligomer with a high HFP ratio can be used, and as a material of the gel electrolyte between the cathode and the anode, polymer or oligomer which has a HFP ratio which can achieve a balance between ionic conductivity and mechanical strength.

6. Exemplification and Listing of Modifications

In addition, as mentioned above, the above-mentioned embodiments and specific examples are only what only showed an example of the realization of the present invention which the applicants considered as the best at the application time of a present application for the time being and, inherently, the present invention should not be limited at all by the above-mentioned embodiments and specific examples. Therefore, it is a matter of course that various modifications may be given to the above-mentioned embodiments and specific examples unless they change the substantial part of the present invention.

Hereafter, some modifications will be explained. In the explanation of the following modifications, also in the modifications, the same name and the same mark shall be assigned to each component which has same composition and function as those of each component in the above-mentioned embodiments. And, as for explanation of the component, the explanation in the above-mentioned embodiments shall be suitably used unless it causes inconsistency.

But, it is needless to say that modifications are not limited to the following, either. It should not be allowed to interpret the present invention in a limited way based on the description of the above-mentioned embodiments or the following modifications since it unreasonably prejudices the applicant interests while it unfairly benefits an imitator (even more so especially under the first-to-file rule which hurries application).

Moreover, it is also needless to say that all or a part of configurations of the above-mentioned embodiments and configurations described in each of the following modifications may be applied suitably in combination unless it causes technical inconsistency.

The configuration of the lithium secondary battery 1 which is a target for application of the present invention is not limited to the configuration as mentioned above. For example, the present invention is not limited to what is called liquid type battery configuration. That is, for example, as electrolyte, gel electrolyte and polymer electrolyte may be used. Moreover, cathode active material which can be used in the present invention is not limited to the composition shown in the above-mentioned specific examples.

The production method of the present invention is not limited to the above-mentioned specific examples at all. For example, the present invention is not limited to manufacture of the cathode active material particles 22 by what is called a "one-step heat treatment process" like the above-mentioned specific example.

That is, the present invention is applicable to what is called a "two-step heat treatment process" wherein the mixture of transition metal compounds other than a lithium compound is provisionally fired prior to a firing step. In this case, the provisional firing step may be performed on the above-mentioned agglomerated object. Alternatively, after performing a forming step in the state where a lithium compound is not added to slurry for forming and then the formed object is provisionally fired, a lithium compound is sprinkled over the formed object and a firing step (lithium introduction step) is performed, and thereby cathode active material particles may be formed.

Grooves and/or concavity and convexity (unevenness) may be preliminarily formed in the principal surface of the formed object after forming and before drying by machining. In this case, in addition to such preliminary grooves and unevenness (or inside thereof), infinite grooves G or unevenness inside the grooves G may be formed "As-Fired". Therefore, in this case, it is can be expected that the above-mentioned anchor effect becomes still larger.

In addition, it is a matter of course that modifications which are not particularly referred to are also included in the technical scope of the present invention as long as it does not change the substantial part of the present invention.

Moreover, among respective elements which constitute the means for solving the subject of the present invention, the element which is expressed operatively or functionally includes any structures which can realize the operation and function besides the concrete structure currently disclosed in the above-mentioned embodiments and modifications. Furthermore, the contents of the prior application or each official gazette cited in the present specifications (including description and drawings) may be suitably used as what constitutes some of the present specifications.

The invention claimed is:

1. A production method of a cathode active material plate which is a plate-like member containing cathode active material of a lithium secondary battery comprising:
   an agglomeration step wherein a granular agglomerated object is formed by using a first slurry containing a transition metal compound which is a raw material of said cathode active material,
   a forming step wherein a formed object in a shape of a thin plate is formed by using a second slurry containing said agglomerated object, and a plurality of randomly formed grooves consisting of a concave portion in a planar view are formed in a principal surface of the formed object by drying the formed object, and
   a firing step wherein said cathode active material plate is obtained by firing said formed object.

2. The production method of a cathode active material plate according to claim 1, wherein
   said grooves are formed without additional processing of the surface of a sintered object.

3. The production method of a cathode active material plate according to claim 1, wherein
   said grooves are generated during a drying process of said formed object without passing through machining.

4. The production method of a cathode active material plate according to claim 1, wherein
   each of said plurality of grooves is formed as an individual groove separate from the remaining grooves in a planar view.

5. The production method of a cathode active material plate according to claim 1, wherein
   said first slurry and said agglomerated object contain a transition metal compound other than lithium, and
   said second slurry contains said agglomerated object and said lithium compound.

6. The production method of a cathode active material plate according to claim 1, wherein
   concavity and convexity resulting from the particle form of said agglomerated object are formed on the inside of said grooves.

7. The production method of a cathode active material plate according to claim 6, wherein said concavity and convexity are formed without additional processing of the surface of a sintered object.

8. The production method of a cathode active material plate according to claim 6, wherein
said concavity and convexity are generated during a drying process of said formed object without passing through machining.

9. The production method of a cathode active material plate according to claim 1, wherein
the viscosity of said second slurry is adjusted to 100-1500 mPa·s.

10. A production method of a cathode for a lithium secondary battery equipped with a cathode collector and a cathode active material plate which is joined with the cathode collector through a conductive junction layer and contains a cathode active material comprising:
an agglomeration step wherein a granular agglomerated object is formed by using a first slurry containing a transition metal compound which is a raw material of said cathode active material,
a forming step wherein a formed object in a shape of a thin plate is formed by using a second slurry containing said agglomerated object, and a plurality of randomly formed grooves consisting of a concave portion in a planar view are formed in a principal surface of the formed object by drying the formed object,
a firing step wherein said cathode active material plate is obtained by firing said formed object, and
a junction step wherein said cathode collector and said cathode active material plate are joined through said conductive junction layer.

11. The production method of a cathode for a lithium secondary battery according to claim 10, wherein
said grooves are formed without additional processing of the surface of a sintered object.

12. The production method of a cathode for a lithium secondary battery according to claim 10, wherein
said grooves generated during a drying process of said formed object without passing through machining.

13. The production method of a cathode for a lithium secondary battery according to claim 10, wherein
each of said plurality of grooves is formed as an individual groove separate from the remaining grooves in a planar view.

14. The production method of a cathode for a lithium secondary battery according to claim 10, wherein
said first slurry and said agglomerated object contain a transition metal compound other than lithium, and
said second slurry contains said agglomerated object and said lithium compound.

15. The production method of a cathode for a lithium secondary battery according to claim 10, wherein
concavity and convexity resulting from the particle form of said agglomerated object are formed in the inside of said grooves.

16. The production method of a cathode for a lithium secondary battery according to claim 15, wherein
said concavity and convexity are formed without additional processing of the surface of a sintered object.

17. The production method of a cathode for a lithium secondary battery according to claim 15, wherein
said concavity and convexity are generated during a drying process of said formed object without passing through machining.

18. The production method of a cathode for a lithium secondary battery according to claim 10, wherein
the viscosity of said second slurry is adjusted to 100-1500 mPa·s.

19. The production method of a cathode for a lithium Secondary battery according to claim 10, wherein
said junction step includes
joining said cathode collector and said cathode active material plate through said conductive junction layer in a state where said principal surface of said cathode active material plate with said grooves formed therein is opposed to said conductive junction layer side.

20. The production method of a cathode for a lithium secondary battery according to claim 10, wherein
said junction step wherein: includes
joining said cathode collector and said cathode active material plate through said conductive junction layer in a state where said principal surface of said cathode active material plate with said grooves formed therein is opposed to the side opposite to said conductive junction layer.

* * * * *